United States Patent
Xu et al.

(10) Patent No.: US 6,885,638 B2
(45) Date of Patent: Apr. 26, 2005

(54) METHOD AND APPARATUS FOR ENHANCING THE QUALITY OF SERVICE OF A WIRELESS COMMUNICATION

(75) Inventors: Hua Xu, Lake Zurich, IL (US); John M. Harris, Chicago, IL (US); Irfan Ali, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/170,982

(22) Filed: Jun. 13, 2002

(65) Prior Publication Data

US 2003/0231594 A1 Dec. 18, 2003

(51) Int. Cl.[7] .......................... G01R 31/08; G06F 11/00; G08C 15/00; H04J 1/16; H04J 3/14
(52) U.S. Cl. ....................... 370/230; 370/235; 370/412
(58) Field of Search ................ 370/229, 230, 370/230.1, 235, 236, 310, 338, 351, 356, 389, 400, 401, 410, 412, 428, 429, 310.1, 328, 395.1, 395.4–395.43

(56) References Cited

U.S. PATENT DOCUMENTS 6,501,733 B1 * 12/2002 Falco et al. ................. 370/235

| | | | | |
|---|---|---|---|---|
| 2002/0024976 A1 | * | 2/2002 | Miura et al. | 370/535 |
| 2002/0126675 A1 | * | 9/2002 | Yoshimura et al. | 370/395.21 |
| 2002/0181470 A1 | * | 12/2002 | Agnevik et al. | 370/395.21 |
| 2003/0007453 A1 | * | 1/2003 | Ogier et al. | 370/229 |

* cited by examiner

Primary Examiner—Frank Duong
Assistant Examiner—Kevin C. Harper (57) ABSTRACT

A communication system and method assigns, such as by marking headers of wireless communication packets, packet classification data to packets to define at least one of the following classes: a control signaling class, such as in-band signaling and control packets, a voice class, a data retransmission class, OAMP class and a data class and wherein each class represents a different transmission priority over a backhaul link. For wireless communication packets associated with the control signaling class and the voice class, the method and apparatus assigns each of the wireless communication packets with additional drop precedent data wherein the drop precedence data defines a further packet drop priority within the control signaling class and the voice class. The apparatus and method drops a queued classified wireless communication packet based on a priority level of assigned drop precedent data and based on the packet classification data.

20 Claims, 6 Drawing Sheets

| PACKET CLASSIFICATION DATA 302 (3BITS) | TRAFFIC TYPE | DROP PRECEDENCE DATA 308 (3BITS) | PACKET CONTENT DESCRIPTION |
|---|---|---|---|
| 100 | CONTROL SIGNALING CLASS | 011 | POWER CONTROL AND HANDOFF RELATED SIGNALING |
|  |  | 010 | CALL PROCESSING RELATED SIGNALING |
|  |  | 001 | REGISTRATION |
|  |  | 000 | OAMP RELATED SIGNALING |
| 011 | VOICE FRAME RATE CLASS | 111 | HALF RATE WITH FQI (FRAME QUALITY INDICATOR) = 1 (CRC PASS) |
|  |  | 110 | FULL RATE WITH FQI = 1 |
|  |  | 101 | HALF RATE WITH FQI = 0 (CRC FAILURE) |
|  |  | 100 | FULL RATE WITH FQI = 0 |
|  |  | 011 | QUARTER RATE WITH FQI = 1 |
|  |  | 010 | QUARTER RATE WITH FQI = 0 |
|  |  | 001 | EIGHTH RATE WITH FQI = 1 |
|  |  | 000 | EIGHTH RATE WITH FQI = 0 |
| 010 | RETRANSMISSION CLASS | 000 | HALF RATE WITH FQI (FRAME QUALITY INDICATOR) = 1 (CRC PASS) |
| 001 | DATA CLASS | 011 | NEW RLP WITH FQI = 1 |
|  |  | 010 | NEW RLP WITH FQI = 0 |
|  |  | 001 | IDLE RLP FRAMES WITH FQI = 1 |
|  |  | 000 | IDLE RLP FRAMES WITH FQI = 0 |
| 000 | OAMP CLASS |  |  |

*FIG. 5*

| PACKET CLASSIFICATION DATA 302 (3BITS) | TRAFFIC TYPE | DROP PRECEDENCE DATA 308 (3BITS) | PACKET CONTENT DESCRIPTION |
|---|---|---|---|
| 100 | CONTROL SIGNALING CLASS | 011 | POWER CONTROL AND HANDOFF RELATED SIGNALING |
| | | 010 | CALL PROCESSING RELATED SIGNALING |
| | | 001 | REGISTRATION |
| | | 000 | OAMP RELATED SIGNALING |
| 011 | VOICE FRAME RATE CLASS | 111 | HALF RATE |
| | | 110 | FULL RATE |
| | | 101 | QUARTER RATE |
| | | 100 | EIGHTH RATE |
| 010 | RETRANSMISSION CLASS | 000 | DATA RETRANSMISSION AND NACK |
| 001 | DATA CLASS | 000 | NEW RLP FRAMES |
| | | 001 | IDLE RLPFRAMES |
| 000 | OAMP | | |

METHOD AND APPARATUS FOR ENHANCING THE QUALITY OF SERVICE OF A WIRELESS COMMUNICATION

BACKGROUND OF THE INVENTION

The invention relates generally to communication systems and methods and more particularly to communication systems and methods that employ communication packet dropping to reduce communication link congestion.

Wireless internet protocol (IP) cellular networks are known which employ network elements, such as base transceiver stations which communicate wirelessly with wireless devices, such as PDAs, internet appliances, cellular telephones and other mobile and non-mobile devices. Such networks communicate packets of information to other network elements such as selection and distribution units (SDU's) which may then be connected to mobile switching centers and public switching telephone networks or packet data serving nodes, the Internet, or any other suitable element or network. The network elements, such as the base transceiver stations, which communicate wireless information to a wireless device, are typically coupled to other network elements via lower speed but heavily utilized communication links, sometimes referred to a backhaul links, such as T1 links or other suitable links. These backhaul links are then often connected to an access node that serves as a router which is then connected to an IP network such as a series of high speed links which are then coupled to other network elements.

Links which are very highly utilized, such as backhaul links, can become congested. This can serve as a bottleneck which can undesirably reduce the performance of a wireless device or of an entire network. For traffic in a reverse link communication, such as from the wireless device to the base transceiver station, queuing of packets for communication by the base transceiver station typically occurs at an output port of the base transceiver station that is coupled to the IP network. Alternatively, for forward link traffic, congestion typically occurs on the output port of the access node such as the router that is coupled with the base transceiver station via the backhaul link.

Routers are known in communication systems which drop packets based on IP packet header information. Such routers can use differing techniques for determining which packet to drop. For example, weighted random early detect (WRED) processes can be used to selectively drop packets that have different drop precedence values designated in the header portion of a packet. For example, routers may discard lower priority packets when the packets are located in a single queue based upon packet marking. Moreover, wireless communication systems are known to drop packets with unsuitable power levels or based on other criteria.

In digital cellular systems, it is common to send control/signaling information through the active traffic channel. Including control or signaling information in a traffic channel is commonly referred to as in-band signaling. The packets that carry this critical control/signaling information are mixed in with the router bearer traffic and transmitted in the packet network. Some examples of in-band signaling messages are handoff direction messages, indicating when and which handoff will occur between wireless devices, power control messages indicating the power level setting for a mobile device, extended handoff direction messages and other information, which is useful on a forward link communication.

In a reverse link, some critical in-band signaling message are the pilot strength measurement message, a power measurement report message indicating, for example, the amount of power detected in a signal, and a handoff completion message. However, not all packets on the traffic channel carry these critical signaling messages. In conventional communication systems, the critical signaling traffic is treated as bearer traffic on the backhaul link, and as such can experience the same delays as voice and bearer traffic rather than getting lower delays which are provided to out of band signaling traffic. Most of the in-band control signaling packets are real time signaling messages used for hand off and power control. The fast delivery of these messages can be crucial in order to provide adequate quality of service to end users. Moreover, certain information is more critical than other information. For example, it may be more desirable to ensure that voice frames are not dropped during a communication and instead other types of packets with less impact on quality of service could be dropped to reduce congestion in a backhaul link.

Accordingly, a need exists for an approved method and apparatus for enhancing the quality of service of a wireless communication.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Briefly, a communication system and method assigns, such as by marking headers of wireless communication packets, packet classification data to packets to define at least one of the following classes: a control signaling class, a voice class, a data retransmission class, a data class and an OAMP class and wherein each class represents a different transmission priority over a backhaul link. For wireless communication packets associated with the control signaling class and the voice class, the method and apparatus assigns each of the wireless communication packets with additional drop precedent data wherein the drop precedence data defines a further level of packet drop priority within the control signaling class and the voice class. The apparatus and method queues, such as in a plurality of different queues, the plurality of wireless communication packets based on the packet classification data, and drops a queued classified wireless communication packet based on a priority level of assigned drop precedent data and based on the packet classification data. In-band control and signaling packets are detected and given higher priority over voice and data bearer traffic to reduce congestion in the backhaul link.

Figure 1:
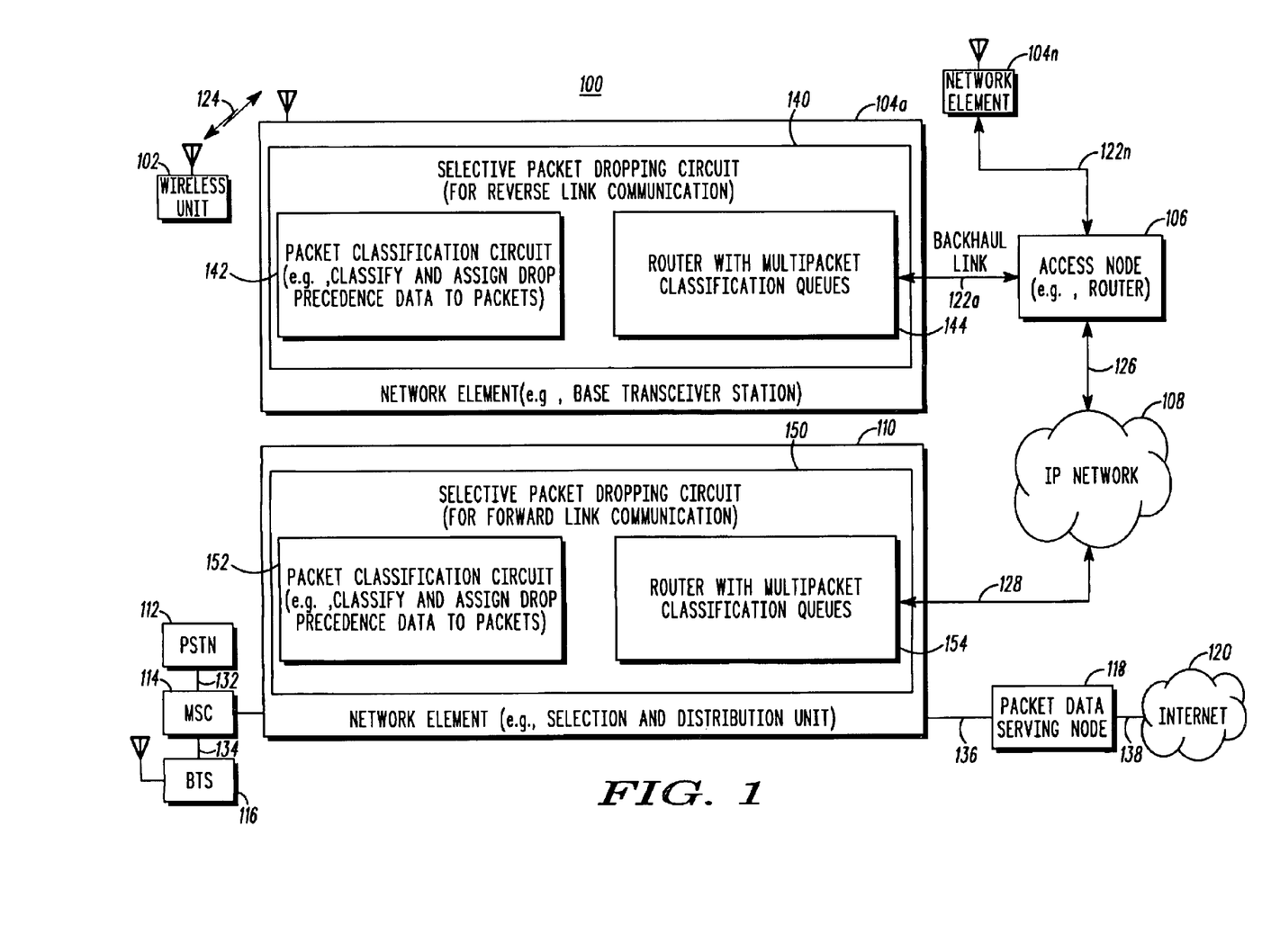
FIG. 1 is a block diagram illustrating one example of a digital wireless communication system in accordance with one embodiment of the invention.

FIG. 1 illustrates an example of a wireless communication system 100 such as an IP based cellular network such as a digital cellular system, or any other suitable wireless communication system employing wireless communication packets (including voice frames). A wireless unit 102, communicates with one or more network elements 104a–104n. The wireless communication system 100 also includes an access node router 106, an IP network 108, and at least a second network element 110. By way of example, the network element 110 may be operably coupled to a public switching telephone network 112 through a mobile switching center 114. The mobile switching center 114 may be in communication with one or more base transceiver stations 116 to facilitate mobile unit to mobile unit calls. A network element may also be coupled to a packet data serving node 118 which may be suitably coupled to the Internet 120 or any other suitable network. The access node 106 may be, for example, a router which communicates wireless communication packets to the network elements 104a–104n through one or more backhaul links 122a–122n. Each network element 104a–104n queues wireless communication packets during reverse link communications. For forward link traffic, the access node 106 queues wireless communication packets that are to be communicated to the network element 104a and subsequently communicated to the wireless unit 102 via a suitable wireless link 124. As shown, the access node 106 is in operative communication to the IP network 108 through any suitable communication link 126. It will also be recognized that the access node 106 may be part of the IP network 108. The network element 110 is also operably coupled to the IP network 108 through a suitable communication link 128. Similarly, the network element 110 is operatively coupled to the PSTN 112, the MSC 114 and the BTS 116 through suitable communication links 130, 132 and 134. The network element 110 is also suitably coupled to the packet data serving node 118 through communication link 136. The packet data serving node 118 is operatively coupled to the Internet 120 through a suitable communication link 138.

The network element 104a as shown in this example may be a base transceiver station or any other suitable network element. The network element 104a includes a selective packet dropping circuit 140 which includes a packet classification circuit 142 and a router circuit 144 with packet classification queues. As with conventional digital wireless communication networks, the backhaul link 122 carries Internet protocol (IP) packet traffic. This includes out of band call control traffic as well as bearer traffic packets. Fields within an IP header within a packet may be used to classify packets into different classes. As described later herein, levels of backhaul link transmission priority classification and backhaul link drop precedence priority is used to enhance bandwidth of the backhaul link 122 by selectively dropping bearer traffic from transmission over a backhaul link that have lower utility to an end user experience.

The network element 104a includes conventional communication hardware and software to facilitate wireless communication as known in the art. However, in addition, the network element 104a includes the selective packet dropping circuit 140 which may be implemented, for example, as a suitably programmed processing device such as a DSP, a microprocessor, microcomputer, or any other suitable processing device. In addition, the selective packet dropping circuit 104 may be implemented as a combination of discrete logic and/or combination of hardware, software and firmware or any other suitable structure.

The network element 110 also includes a selective packet dropping circuit 150 which is used, for example, for forward link communications in a similar fashion on the selective packet dropping circuit 140 is in use for reverse link communication. Hence, the selective packet dropping circuit 150 also includes a packet classification circuit 152 and a routing circuit 154 with packet classification queues. The selective packet dropping circuit 150 is also implemented using the same structure as circuit 140.

Figure 2:
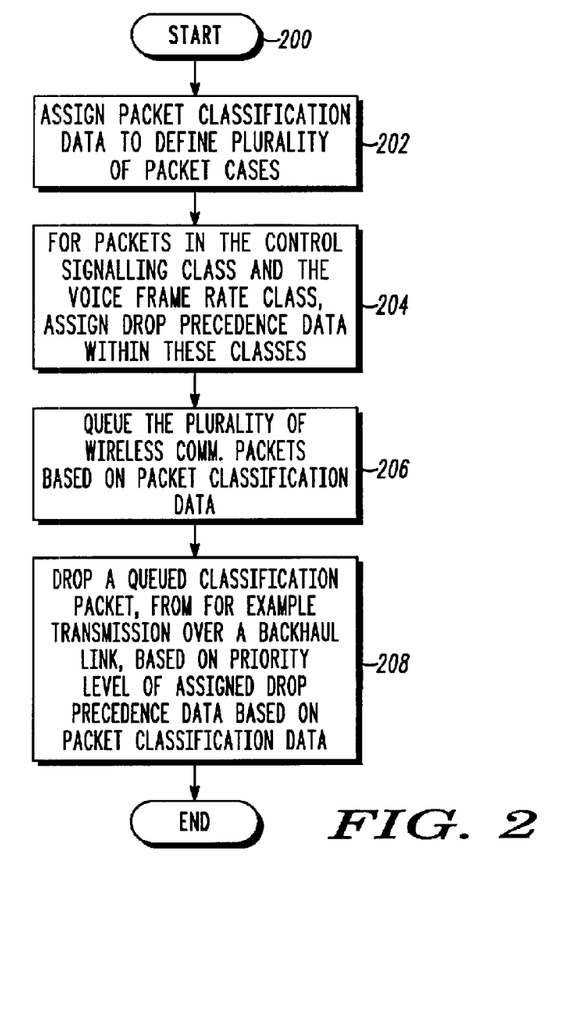
FIG. 2 is a flow chart illustrating one example of method for enhancing a quality of service of a wireless communication in accordance with one embodiment of the invention.
Figure 3:
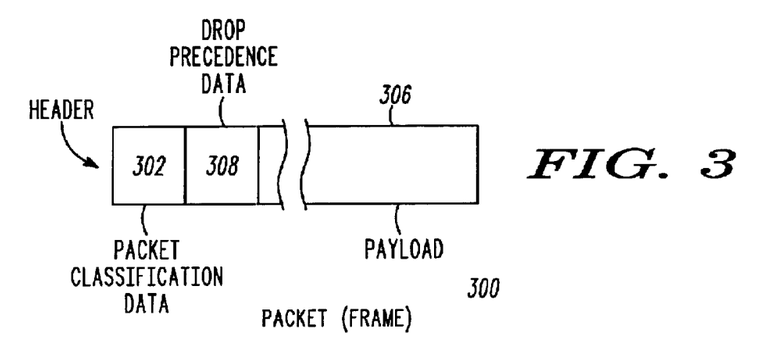
FIG. 3 is a diagram illustrating one example of a wireless communication packet employing both packet classification data and drop precedence data in accordance with one embodiment of the invention.

Referring to FIGS. 2 and 3, one method for enhancing quality of a service for a wireless communication such as operations carried out by the selective packet dropping circuit 140 will be described. As shown in block 200, the method includes the network element 104a receiving a plurality of wireless communication packets from the wireless unit 102. As shown in block 202, the method includes assigning packet classification data 302 to each of the plurality of wireless communication packets. Packet classification data 302 in this example defines at least one of the following classes: a control signaling class, a voice class, a data retransmission class and a data class. Each class represents a different backhaul link transmission priority. For example, a voice frame is assigned a higher transmission priority and hence a different class than a packet containing data which may receive a lower transmission priority since voice frames typically require real time transmission whereas data may be delayed or if necessary, retransmitted if congestion in the backhaul link occurs.

Assigning the plurality of wireless communication packets with packet classification data 302 includes marking each of the plurality of packets by inserting the packet classification data 302 (e.g. bits) in a packet header 304 of an IP packet 300. The IP packet 300 includes a payload portion 306 and a header portion 304. Assigning the packet classification data 302 is performed by the packet classification circuit 142. Each classification represents a different drop priority. Packets in a higher class are dropped with a lower probability than those packets categorized in a classification that defines a lower priority category.

Since control and signaling information typically is critical in wireless communication systems, in this example in-band control signaling packets are given a high priority and are passed through or transmitted through the backhaul link compared with other classes of information if congestion occurs. In addition, voice packets are also fairly critical and oftentimes require real time transmission and hence are accorded a little lower priority for transmission through the backhaul link 122 compared to the in-band control signaling packets, but the voice packets have a higher priority for transmission compared to, for example, other classes of information. As used herein, the control signaling class represents in-band signaling which is control information, that is, packets communicated on traffic channels that are typically treated as bearer traffic on backhaul links.

As shown in block 204, for packets in the control signaling class and in the voice class, the method includes assigning drop precedence data 308 within each of these classes. The voice packets are classified in the voice class. However, it will be recognized that any suitable designation technique may be utilized. A higher priority is assigned to in-band signaling packets compared to voice packets. In voice calls, there are typically four packet types such as half rate, full rate, quarter rate and eighth rate frames depending upon voice activity and vocoder processing. A drop precedence priority is set for differing voice packets depending upon the voice frame rate of a particular packet. In this embodiment, a half rate packet is given a higher drop precedence, meaning that the system is less likely to drop a half rate frame compared to an eight or quarter rate encoded speech packet. Accordingly, the packet classification circuit 104, in addition to classifying packets in a first priority class, subsequently prioritizes packets within each class and assigns drop precedence data to differing types of packets within a class, if necessary.

As shown in block 206, the method includes queuing the plurality of wireless communication packets based on the packet classification data 302. For example, the router 144, or other circuit includes memory for storing the wireless communication packets with the same assigned class to a same queue. Therefore, the router 144 includes a separate packet queue for packets classified as control signaling class packets and another separate queue for packets designated as voice class packets, another queue for packets designated as data retransmission class packets, another queue for packets designated as OAMP packets and another queue for packets designated as data packets. The router 144 of the selective packet dropping circuit 140 then selectively drops a queued classified wireless communication packet based on a priority level the packet classification data 302 and based on the assigned drop precedence data, respectively.

The drop precedence data 308 defines a further packet drop priority within the control signaling class and the voice class as applied to these particular classes. Moreover, the drop precedence data 308 can define further packet drop priorities within any class if desired. By way of example, and referring to voice packets, half and full rate packets are given a higher drop precedence than eighth and quarter rate frames since eight and quarter rate frames consume significant amounts of capacity on the backhaul link and provide a much smaller voice quality improvement than do full and half rate frames.

For reverse link communications, the frame or packet type information referred to above is also analyzed in connection with frame quality indicator fields of a packet to use to determine the type of marking or assignment that a packet receives as further shown in FIGS. 5 and 6 and described later herein. For example, frames with a low frame quality as indicated by the frame quality indicator value are more likely to be ignored in favor of frames with a higher frame quality. Generally, the lower quality frames consume between 1% and 10% of the total traffic. Hence, it is beneficial to differentiate these frames from other traffic types and discard them when the backhaul link is congested. By marking packets for different drop precedence based on voice rate information and frame quality indicators, during congestion events on the backhaul link, poor frame quality indicator packets and eighth rate voice packets will be dropped with greater probability than other half rate, full rate and quarter rate voice frames. This can lead to lower degradation and higher perceived user voice quality than when there is no preferential drop probability mechanism.

Another class that is designated is an operation and maintenance class for packets containing operation, administration, maintenance and provisioning (OAMP) information and as such five classes of packets are described herein. However, it will be recognized that any suitable number of classifications may also be used.

Figure 4:
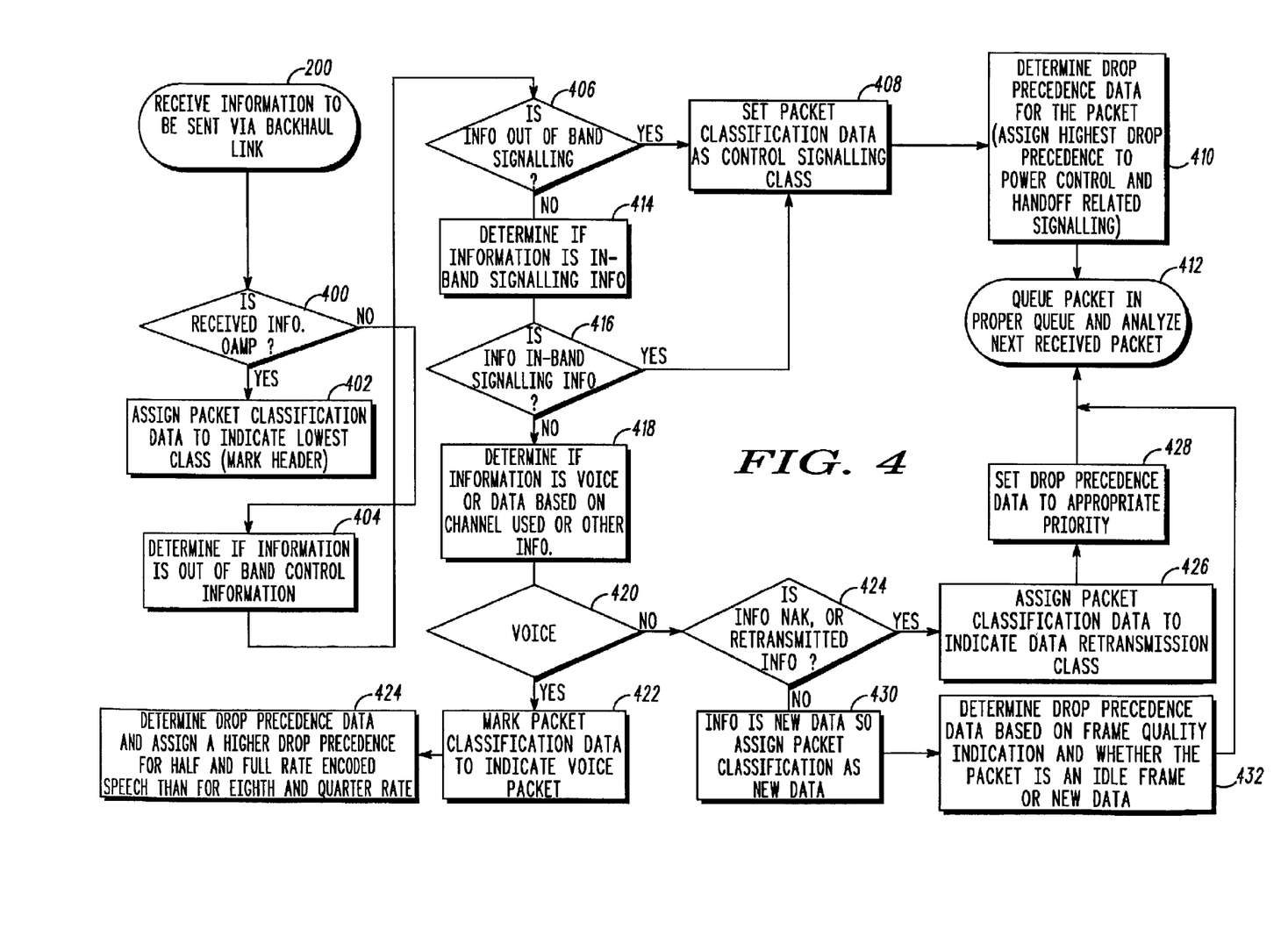
FIG. 4 is a flow chart illustrating one example of a method for enhancing a quality of service of a wireless communication in accordance with one embodiment of the invention.
Figure 5:
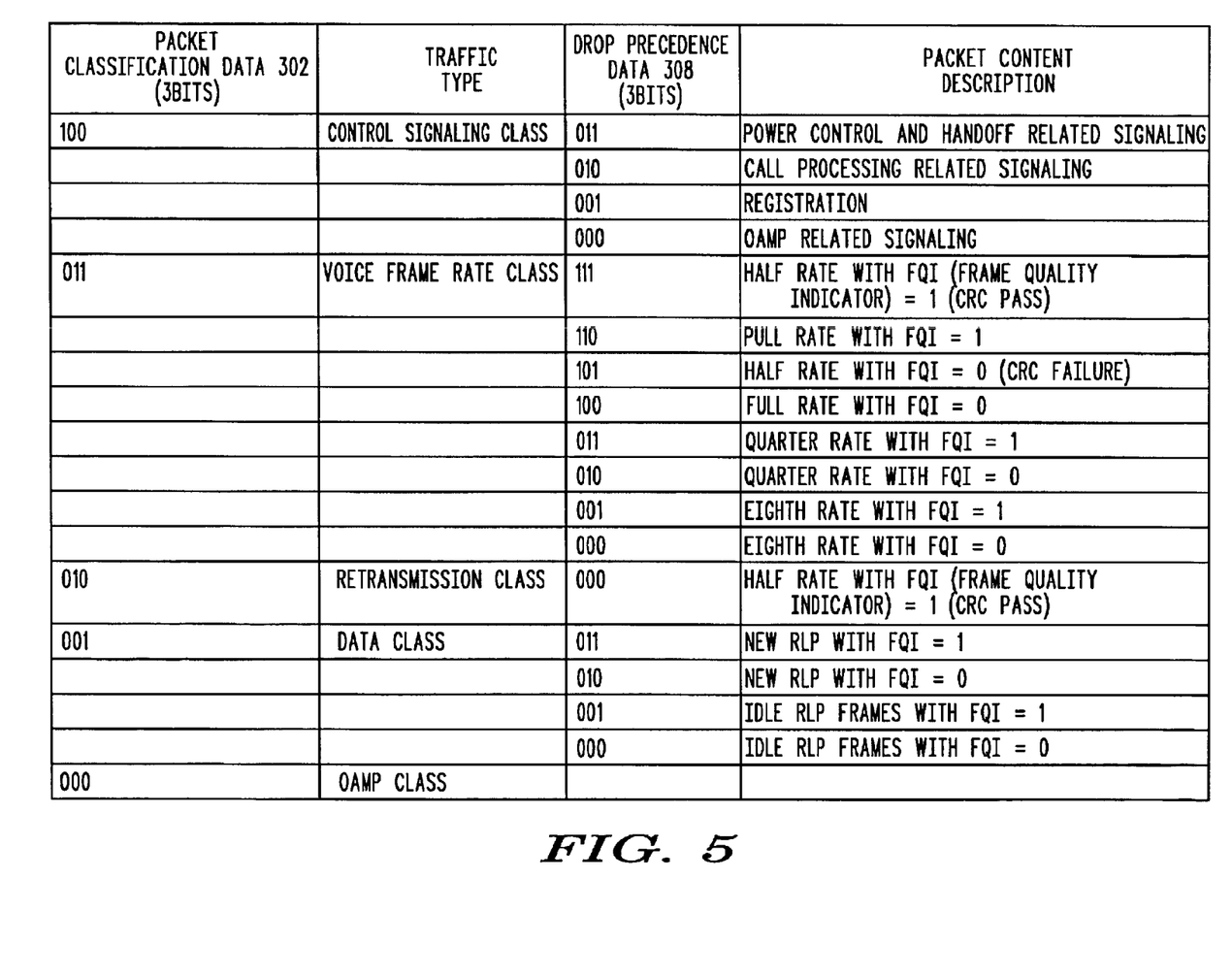
FIG. 5 is a chart illustrating one example of packet marking for reverse link frames or packets in accordance with one embodiment of the invention.

Referring to FIGS. 4 and 5, a more detailed description of a method for enhancing a quality of service of a wireless communication will be described with reference to a reverse link communication. In this example, the selective packet dropping circuit 140 carries out these functions, but they may be carried out by any other unit or units. After information, such as a plurality of wireless communication packets or other information is received by the network element 104a from the wireless unit 102, wherein the received information is to be sent via the backhaul link 122, the method includes as shown in block 400, determining if the received information is an operation and maintenance packet. This is done by checking packet type bits in the header or set by the system. If so, as shown in block 402, the method includes assigning a packet classification data to indicate this packet is of a lowest priority class, namely marking the packets as one in the operational and maintenance class by marking the IP header with the appropriate packet classification data. In this example, packet classification data is 000 as shown in FIG. 5.

Marking packets on the reverse link is preferably done at the time the radio sample is received over the interface at the network element 104a and is assembled into IP packets for transport over the backhaul link 122 to the network element 110. In addition to the same marking information used in the forward link, the frame quality indicator bit which indicates the radio frequency link CRC checking results is also used in the packet drop precedence marking. The distinction between dim and burst voice frames and normal voice frames is available also at the network element 104a at the beginning of a frame. For instance, for the dim and burst signaling and CDMA systems, the voice frame contains the signaling message for the reverse link and can be recognized that the network element 104a by looking into multimodal bits and traffic type bits set in information fields within the packet.

Hence the selective packet dropping circuit 140 assigns the plurality of wireless communication packets with packet classification data wherein each of the classes has a different transmission priority such that the order of transmission priority among the classes include the control signaling class having a higher priority than the voice class which has a higher priority than the data re-transmission class which in turn has a higher priority than the data class.

If the received information is not operation and maintenance data, the method includes, as shown in block 404, determining if the information is out of band control information. It will be recognized that at the time of creation of each packet, at the network element 104a, for example, the knowledge of the packet type (or the frame type) to mark the packet with the classification data and drop precedence data may be obtained from the information elements within a packet found in each frame header. For example, the knowledge of in-band signaling, voice, and data frame types can be obtained from information elements from every forward and reverse frame header which may be specified by a system such as "interoperability specification IOS" for CDMA 2000 access network interfaces (PN-4545). The information may include the rate set indicator, the forward and reverse channel rate, frame quality indicator and message type for in-band or out of band signaling. For RLP frames, such as retransmissions, NACKS and original data transmissions can be identified by their RLP header as specified, for example, in "IS-707 Data Service Options for Spread Spectrum Systems-Addendum 2" (PN-4692).

As shown in block 406, if the information is out of band signaling, which is determined based on the channel associated with the information such as if the packet is a control channel packet versus a bearer traffic packet, the process continues to block 408 where the selective packet dropping circuit 140, and more particularly the packet classification circuit 142, sets the packet classification data to indicate that packet is in the control signaling class as shown in block 408. Hence the packet classification data 302 may be set as "100" as shown in FIG. 5. As shown in block 410, the classified packet is then analyzed to determine the drop precedent data to assign for the packet. For example, the packets are evaluated to determine whether the out of band packet includes power control and hand off related signaling information. If so, it is assigned the highest drop precedent value in this case 011, among the various priority classes within the packet classification of class 100. If, for example, the data refers to wireless registration information, the drop precedence data for packet class 100 is set at 001 as shown. Once both the packet classification data is market in the header and the packet has also been marked with the drop precedence data for a particular class, the method as shown in block 412 includes queuing the wireless communication packets based on the packet classification data in one of a plurality of different classification packet queues (See FIG. 7). The next received packet is analyzed.

Referring back to block 406, if the information is not out of band signaling, the method includes determining if the information is in-band signaling as shown in block 414. This is determined, for example, by analyzing the packet header to determine if it includes mixed mode (MM) and traffic type (TT) bits to indicate whether it is, for example, signaling information or traffic information. If the frame contains in-band signaling information as determined, for example, as shown in block 416, the packet classification data is set as being the highest priority level, namely level 100, as shown in block 408. The information is then analyzed to determine which drop precedence data to assign to that particular high priority packet which has been found to be an in-band signaling packet. Hence, the wireless communication packets are detected to determine whether one of the packets is an in-band signaling packet. If so, drop precedent data is assigned to the detected in-band signaling packet depending upon whether the information is, for example, power control and hand off related signaling, call processing related signaling, registration information, or OAMP related signaling as shown, for example, in FIG. 5. The packets as they are evaluated are queued based on the packet classification data in the appropriate packet classification queue. (See, for example, FIG. 7). Since the in-band signaling packet contains power control and hand off related signaling or other critical signaling information, the router 144 drops a communication packet other than the in-band signaling packet based on the drop precedent data to reduce the amount of information required for communication over the backhaul link during a congestive event. Hence, within a particular class, packets may be dropped depending upon their drop precedence data. Hence, the router 144 sends the in-band signaling packet over the backhaul link 122 and does not send the dropped wireless communication packet over the backhaul link. In this way the critical information is sent during periods of congestion.

As shown in block 418, the method includes determining if the received information is a voice packet or data packet based on the channel used or based on information within the packet itself. For example, the network element 104a will know depending upon which channel the packet was received on, whether it is a voice packet or a data packet. Alternatively, the packets may be identified with bits therein to indicate whether they are voice or data packets. If the packet is determined to be a voice packet as shown in blocks 420 and 422, the method includes marking the packet with classification data to indicate that it is in the voice class. This packet classification data is shown to be 011 in FIG. 5. Once the packet classification has been determined, the drop precedence data 308 within the packet class is determined as shown in block 424.

As to assigning the drop precedence data to the voice class, the packet classification circuit 142 assigns a drop precedence value 308 based on both speech rate data such as whether the speech rate is at half rate, full rate, quarter rate, or eighth rate, and packet quality such as the frame quality indicator.

For voice packets, again those designated to the voice class, the packet classification circuit 142 assigns a higher drop precedence value 308 for half or full rate encoded speech than for eight or quarter rate encoded speech. Full and half rate encoded speech is given a higher drop precedence value than eighth and quarter rate encoded speech. Therefore, eighth rate encoded speech will be dropped from transmission before half rate encoded speech or full rate encoded speech or quarter rate encoded speech. As shown, the frame quality indicator is also taken into account where a "1" indicates a CRC pass.

Referring back to block 420, if the packet is not a voice packet and is not signaling information, the method includes determining whether the wireless communication packet is a packet in the data retransmission class, namely whether the packet is RLP NACK, a RLP retransmission or any other type of frame or RLP frame. This is shown in block 424. This is determined based on information in an RLP header such as a retransmission flag and the control message type for NACK since on the forward link, the network element 110 separates packets into retransmission, NACK and new data packets. Hence, the message value type field and dim and burst information is known by a network element 110 transponder. For each voice frame the network element 110 can mark the in-band and out band signaling with multiple precedence levels. This occurs in the forward link. Similarly, the network element 104a can check the bits in the header of the RLP frames to determine whether the packet is a retransmit, NACK, RLP frame or a new RLP frame. If the information within the packet indicates that it is an NACK frame or retransmission, as shown in block 426, the method includes assigning the packet to the re-transmission class shown in FIG. 5 to be 010. The method includes, as shown in block 428, setting drop precedence data to the appropriate priority and in this example it is set to 000 since there is only one level assigned to packets in the retransmission class. If the information is not NACK, or retransmitted information, and it is not voice information or signaling information, the method includes, as shown in block 430, determining whether the packet is new packet data and if so, marking the packet classification data in the header to be indicative of a data class. In this example, the data class is designated as 001. There are multiple precedent priorities within the data class. As shown in this example there are four levels. The highest level of drop precedence would be if there is a new RLP frame with a high quality. This is given a drop precedence value of 011. Idle RLP frames are the next priority and the packet with the highest quality is given a higher drop precedence value than idle RLP frames with a lower quality. For example, in the forward link, each type of frame is expected to be available at the network element 110 at the time of packet creation. In RLP mode each frame contains a flag which identifies the frame as a retransmission frame or an original frame. Preferably, the same processing device in the network element 110 that creates the RLP frame also wraps the RLP frame with headers to form them into packets indicating whether it is a new RLP frame or a retransmission RLP frame.

In this example (although FIG. 5 shows only one level of drop precedence for the retransmission class), retransmissions not only get higher priority than idle frames, but the oldest retransmission receives the highest priority. In RLP mode, the network element 110 tracks the number of times a frame has been retransmitted thus far. The network element 110 monitors the difference between the RLP frame sequence number and the retransmission sequence number and gives the retransmissions with the smallest modulo sequence numbers the highest priority marking. Hence, when a retransmission is attempted, the sequence number is much smaller than the current sequence number. Since only three, six or four sets of attempts are typically made to send each frame, the retransmission with the smallest sequence number is the oldest and thus has the smallest number of retransmission attempts left before RLP effectively gives up and aborts transmission of the frame. Accordingly, the selective packet dropping circuit 150 operates to give a higher drop precedence to the oldest retransmissions when packets are retransmitted.

Hence the method includes, as shown in block 432, determining the drop precedence data 308 based on frame quality indication and whether the packet is an idle frame or new frame.

Figure 6:
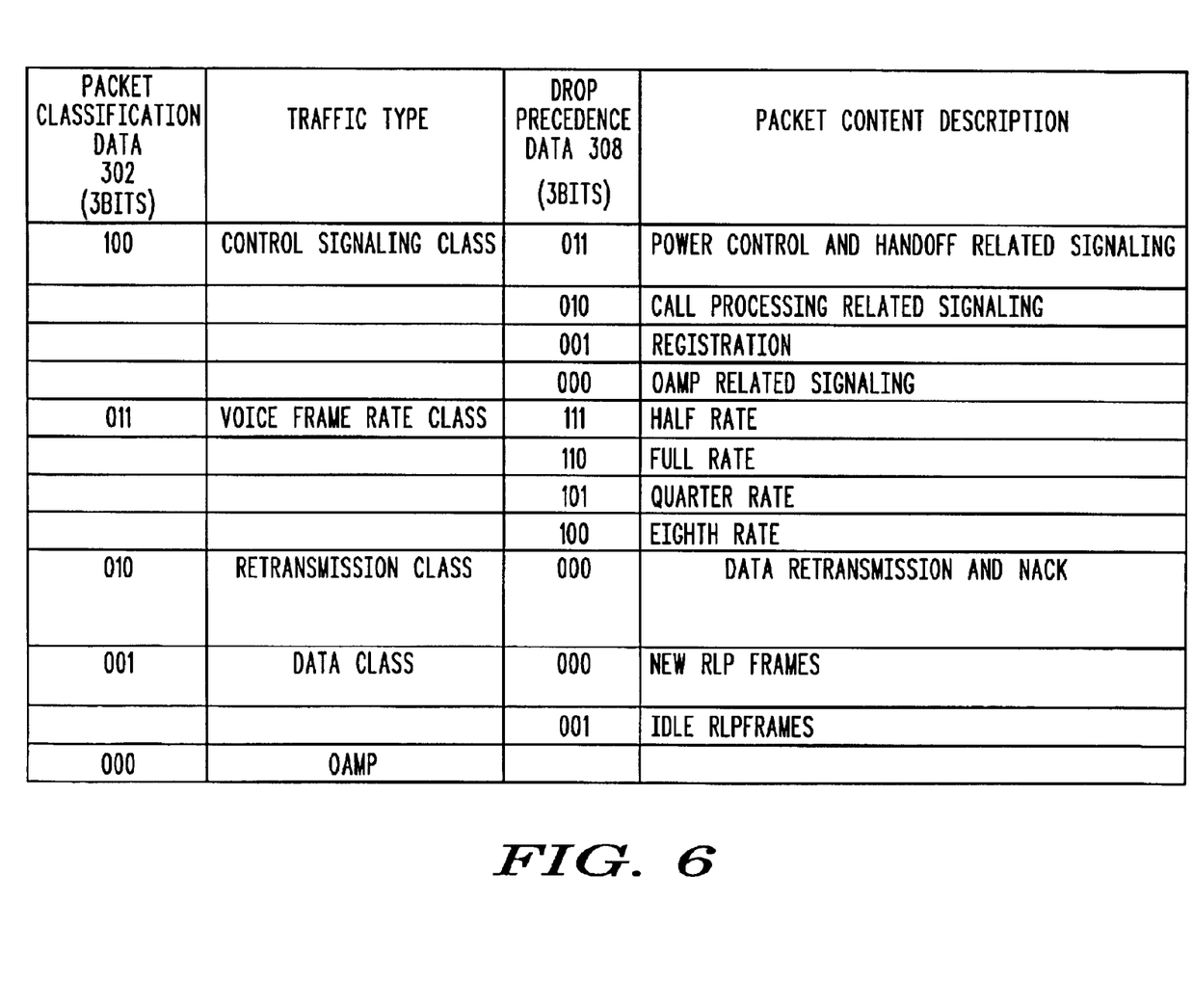
FIG. 6 is a chart illustrating one example of packet marking for forward link packets in accordance with one embodiment of the invention.

FIG. 6 illustrates a table showing the packet classification data and drop precedence data for packets in the forward link.

Figure 7:
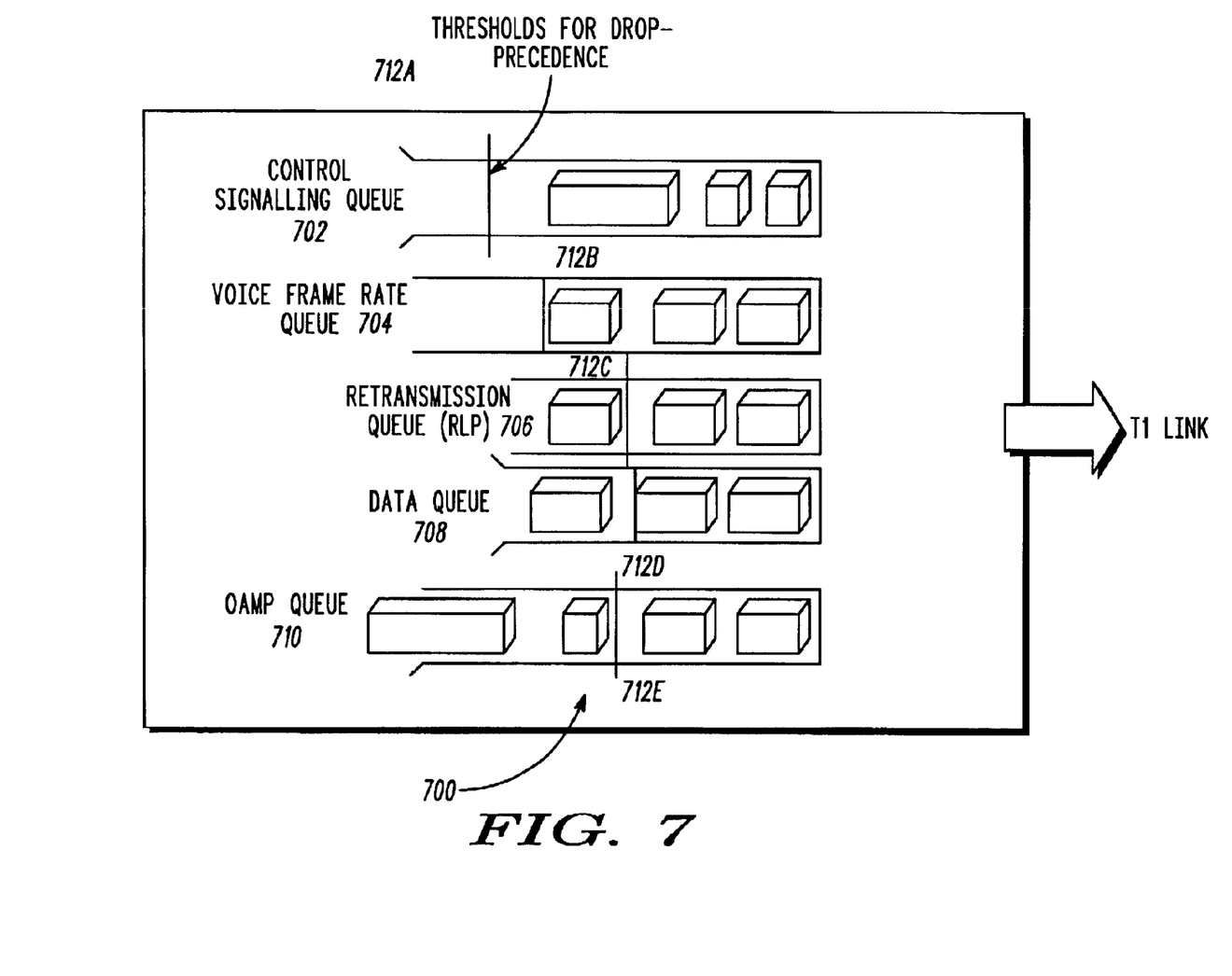
FIG. 7 is a diagram illustrating a plurality of packet queues and associated thresholds for drop precedent in accordance with one embodiment of the invention.

FIG. 7 diagrammatically illustrates a portion of the router 144 which includes a plurality of packet classification queues 700 wherein each queue is dedicated to a different packet classification. The router 144 employs one of a plurality of packet dropping algorithms including, but not limited to for example a priority queuing process, a weighted fare queuing process and a weighted round robin process to determine which wireless communication packet to selectively drop from transmission over the backhaul link 122. As shown in this example, there is a control signaling queue 702, a voice frame rate queue 704, a retransmission queue 706, a data queue 708 and an OAMP queue 710. The packet dropping circuit 140 configures the router 144 to set a queue threshold indicated diagrammatically as 712a through 712e for each of the packet classification queues 700 based on a priority level of each class. For example, the control signaling queue 702 may have a higher threshold allowing more packets to be stored than for example, the OAM queue 710 since the control signaling data is more critical than OAM information. Based on the classification data, the packets are classified into five classes as shown in FIG. 5 (in the reverse link mode). The packet classification queues 700 are served according to a service discipline which may be priority queuing, weighted fair queuing or weighted round robin.

Furthermore in each class, packets are given different drop precedence priorities based on the drop precedence data, namely, the bits in the IP header of the packets. A weighted random early detect process (WRED) is used to selectively drop packets belonging to different drop precedence. Packets with higher precedence data values are dropped with lower probability than packets with lower precedence values. When the average queue size exceeds the minimum threshold for precedence level 1 for example, packets belonging to a lowest precedent subclass within the class get dropped with a small probability. If the average queue size exceeds the maximum threshold, all packets belonging to the precedence subclass of that class are dropped. While manipulating the minimum threshold, maximum threshold and drop probability, packets belonging to different precedence subclasses are dropped before the queue buffer overflows. By dropping packets belonging to lower precedence classes, congestion is avoided. It will be recognized that the thresholds for different drop precedence data can be set within a class based on the mix of voice data traffic and the network and may also be modified for example on a time of day basis to account for variability in the traffic mix. Some desirable considerations for setting the maximum threshold for drop precedence may include, for example, for the control signaling queue, the watermark of discarding the lowest precedence traffic (OAMP) could be set at roughly 5% to 10% of the total band width. However, for higher precedence traffic such as handoff direction messages, the watermark (the buffer threshold would be set higher). The weighted random early detect process is used to determine which frames are discarded. For the voice packets, namely the packets in the voice frame rate queue, the lowest watermark (for the eighth rate packets) should be set roughly at the backhaul link capacity in the 20 msec time frame. For the NACK and re-transmission queue, the watermark should be set very high so that these messages are not discarded. For the new data queue, the watermark should be set to match the maximum amount of desired data to buffer for the system for quality service analysis. Other settings may also be desirable.

The above methods and apparatus provide a selective dropping of bearer traffic to reduce congestion on backhaul links. The operation, although described with respect to a reverse link mode, may be suitably be used in a forward link mode by employing similar queues and operations in the selective packet dropping circuit 150 of the network element 110. Applying multiple priority levels to packets allow packets within a classification can be further controlled and weighed to only drop those packets that would have a lower utility to the end user in a congestion condition. The methodology is applied to both voice and data bearer traffic.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for enhancing a quality of service of a wireless communication comprising:

assigning a plurality of wireless communication packets with packet classification data wherein packet classification data defines at least one of the following classes: a control signaling class, a voice class, a data retransmission class and a data class and wherein each class represents a different transmission priority;

for at least wireless communication packets associated with the control signaling class and the voice class, assigning each of the wireless communication packets with drop precedent data wherein the drop precedence data defines a further packet drop priority within the control signaling class and the voice class;

queuing the plurality of wireless communication packets based on the packet classification data;

dropping a queued classified wireless communication packet based on a priority level of assigned drop precedent data and based on the packet classification data; and wherein assigning the drop precedence data to the wireless communication packet in the voice class includes assigning a higher drop precedence for half rate encoded speech packets than for full rate encoded speech packets.

2. The method of claim 1 wherein assigning the plurality of wireless communication packets with packet classification data includes further assigning each of the classes a different transmission priority such that the order of transmission priority among the classes includes the control signaling class having a higher priority than the voice class which has a higher priority than the data retransmission class which has a higher priority than the data class.

3. The method of claim 1 wherein the step of assigning the plurality of wireless communication packets with packet classification data includes marking each of the plurality of packets by inserting the packet classification data in a packet header.

4. The method of claim 1 wherein the step of assigning each of the wireless communication packets with drop precedent data includes marking each of the plurality of packets by inserting the drop precedent data in a packet header.

5. The method of claim 1 wherein the step of queuing the plurality of wireless communication packets based on the packet classification data includes storing wireless communication packets with a same assigned class to a same queue.

6. The method of claim 1 wherein the step of dropping the queued classified wireless communication packet based on a priority level of assigned drop precedent data and based on the packet classification data includes using at least one of: a priority queuing process, a weighted fair queuing process and a weighted round robin process to determine which wireless communication packet to selectively drop from transmission.

7. The method of claim 6 including the step configuring a queue threshold for each queue based on a priority level of each class.

8. The method of claim 1 wherein assigning the drop precedence data to the wireless communication packet in the voice class includes assigning a drop precedence based on both speech rate data and packet quality data.

9. The method of claim 1 wherein the classes include an operation and maintenance class and has a lower transmission priority than the data class.

10. The method of claim 1 including assigning wireless communication packets determined to be NACKs in the data retransmission class and within the data retransmission class, assigning a higher drop precedence data to retransmission packets that are determined to be an oldest retransmission such that older retransmission packets are assigned a higher drop precedence than subsequently retransmitted packets.

11. An apparatus for enhancing a quality of service of a wireless communication comprising;
  a selective packet dropping circuit operative to:
    assign a plurality of wireless communication packets with packet classification data wherein packet classification data defines at least one of the following classes: a control signaling class, a voice class, a data retransmission class and a data class and wherein each class represents a different transmission priority;

for at least wireless communication packets associated with the control signaling class and the voice class, assign each of the wireless communication packets with drop precedent data wherein the drop precedence data defines a further packet drop priority within the control signaling class and the voice class;
    queue the plurality of wireless communication packets based on the packet classification data;
    drop a queued classified wireless communication packet based on a priority level of assigned drop precedent data and based on the packet classification data to selectively discard wireless communication packets from being transmitted over the backhaul link; and
  wherein the selective packet dropping circuit assigns a higher drop precedence for half rate encoded speech packets than for full rate encoded speech packets.

12. The apparatus of claim 11 wherein selective packet dropping circuit assigns each of the classes a different transmission priority such that the order of transmission priority among the classes includes the control signaling class having a higher priority than the voice class which has a higher priority than the data retransmission class which has a higher priority than the data class.

13. The apparatus of claim 12 wherein the selective packet dropping circuit stores wireless communication packets with a same assigned class to a same queue.

14. The apparatus of claim 11 wherein the selective packet dropping circuit configures a queue threshold for each queue based on a priority level of each class.

15. The apparatus of claim 11 wherein the selective packet dropping circuit assigns the drop precedence data to the wireless communication packet in the voice class by assigning a drop precedence priority based on both speech rate data and packet quality data.

16. The apparatus of claim 11 wherein the selective packet dropping circuit assigns wireless communication packets determined to be NACKs in the data retransmission class and within the data retransmission class, assigns a higher drop precedence data to retransmission packets that are determined to be an oldest retransmission such that older retransmission packets are assigned a higher drop precedence than subsequently retransmitted packets.

17. A method for enhancing a quality of service of a wireless communication comprising:
  assigning a plurality of wireless communication packets with packet classification data wherein packet classification data defines at least one of the following classes: a control signaling class, a voice class, a data retransmission class and a data class and wherein each class represents a different transmission priority;
  for at least wireless communication packets associated with the control signaling class and the voice class, assigning each of the wireless communication packets with drop precedent data wherein the drop precedence data defines a further packet drop priority within the control signaling class and the voice class;
  queuing the plurality of wireless communication packets based on the packet classification data;
  dropping a queued classified wireless communication packet based on a priority level of assigned drop precedent data and based on the packet classification data; and
  wherein assigning the drop precedence data to the wireless communication packet in the voice class includes assigning a drop precedence based on both speech rate data and packet quality data.

18. A method for enhancing a quality of service of a wireless communication comprising:
  assigning a plurality of wireless communication packets with packet classification data wherein packet classification data defines at least one of the following classes: a control signaling class, a voice class, a data retransmission class and a data class and wherein each class represents a different transmission priority;
  for at least wireless communication packets associated with the control signaling class and the voice class, assigning each of the wireless communication packets with drop precedent data wherein the drop precedence data defines a further packet drop priority within the control signaling class and the voice class;
  queuing the plurality of wireless communication packets based on the packet classification data;
  dropping a queued classified wireless communication packet based on a priority level of assigned drop precedent data and based on the packet classification data; and
  assigning wireless communication packets determined to be NACKs in the data retransmission class and within the data retransmission class, assigning a higher drop precedence data to retransmission packets that are determined to be an oldest retransmission such that older retransmission packets are assigned a higher drop precedence than subsequently retransmitted packets.

19. A apparatus for enhancing a quality of service of a wireless communication comprising:
  a selective packet dropping circuit operative to:
    assign a plurality of wireless communication packets with packet classification data wherein packet classification data defines at least one of the following classes: a control signaling class, a voice class, a data retransmission class and a data class and wherein each class represents a different transmission priority;
    for at least wireless communication packets associated with the control signaling class and the voice class, assign each of the wireless communication packets with drop precedent data wherein the drop precedence data defines a further packet drop priority within the control signaling class and the voice class;
    queue the plurality of wireless communication packets based on the packet classification data;
    drop a queued classified wireless communication packet based on a priority level of assigned drop precedent data and based on the packet classification data to selectively discard wireless communication packets from being transmitted over the backhaul link; and
  wherein the selective packet dropping circuit assigns the drop precedence data to the wireless communication packet in the voice class by assigning a drop precedence priority based on both speech rate data and packet quality data.

20. An apparatus for enhancing a quality of service of a wireless communication comprising:
  a selective packet dropping circuit operative to:
    assign a plurality of wireless communication packets with packet classification data wherein packet classification data defines at least one of the following classes: a control signaling class, a voice class, a data retransmission class and a data class and wherein each class represents a different transmission priority;
    for at least wireless communication packets associated with the control signaling class and the voice class, assign each of the wireless communication packets with drop precedent data wherein the drop precedence data defines a further packet drop priority within the control signaling class and the voice class;
    queue the plurality of wireless communication packets based on the packet classification data;
    drop a queued classified wireless communication packet based on a priority level of assigned drop precedent data and based on the packet classification data to selectively discard wireless communication packets from being transmitted over the backhaul link; and
  wherein the selective packet dropping circuit assigns wireless communication packets determined to be NACKs in the data retransmission class and within the data retransmission class, assigns a higher drop precedence data to retransmission packets that are determined to be an oldest retransmission such that older retransmission packets are assigned a higher drop precedence than subsequently retransmitted packets.

* * * * *